(No Model.)

S. FORMAN.
WHEEL.

No. 394,068. Patented Dec. 4, 1888.

WITNESSES.
P. W. Fowler,
W. H. Patterson.

INVENTOR.
Sands Forman,
A. H. Evans & Co.
his Attorneys.

United States Patent Office.

SANDS FORMAN, OF GOLD HILL, NEVADA.

WHEEL.

SPECIFICATION forming part of Letters Patent No. 394,068, dated December 4, 1888.

Application filed August 28, 1888. Serial No. 283,995. (No model.)

*To all whom it may concern:*

Be it known that I, SANDS FORMAN, a citizen of the United States, residing at Gold Hill, in the county of Storey and State of Nevada, have invented certain new and useful Improvements in Bicycles, of which the following is a full and clear description, reference being had to the accompanying drawings, forming a part of this specification, in which—

Figure 1:
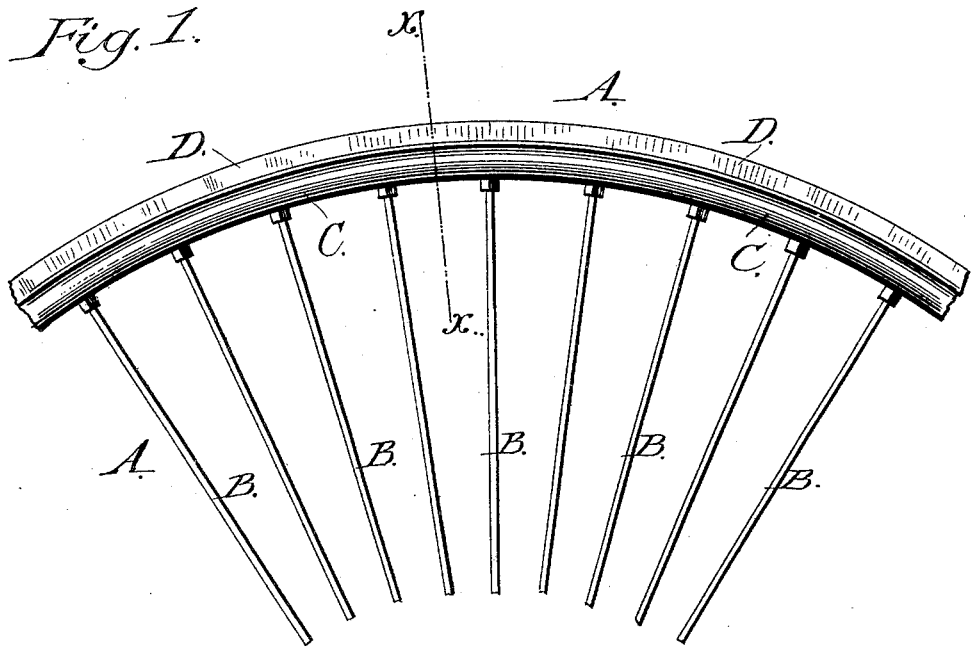
Figure 2:
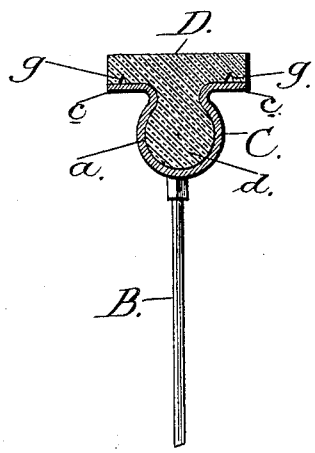

Figure 1 represents a side view of a portion of a bicycle-wheel showing my improvements applied. Fig. 2 is an enlarged cross-sectional view of the same on the line X X of Fig. 1.

My invention relates to the construction of bicycle-wheels; and it consists in the construction and combination of devices, which I shall hereinafter fully describe and claim.

To enable others skilled in the art to make and use my invention, I will now describe the same and indicate the manner in which I carry the same out.

In the said drawings, A represents a portion of a bicycle-wheel of any approved construction, and B indicates the spokes. The hollow felly C is adapted to receive the outer ends of the spokes in the usual manner, and said felly is constructed with a curved or rounded socket, a, the walls of which extend upwardly and are bent outwardly at right angles, as shown at c, for a purpose I will hereinafter fully describe.

The tire D may be formed of any suitable flexible material, preferably rubber, and its cross-sectional configuration closely approximates the design of the felly, it being formed with a curved centrally-projecting portion, d, which snugly fits the socket a in the felly, and laterally-extending portions, which are seated upon the side flanges, c c, of said felly, so as to form a broad tread, the surface of which may be slightly convex or flat, as shown.

A tire constructed as described possesses many advantages not obtained from the use of the usual tires, for I have found by practical experience that my tire is adapted to run on hard surfaces just as well as the round tire, while it is much superior to the latter when running on yielding or sandy roads. The tire D on its under surface is formed with small grooves g, which extend the full length of said tire, and these grooves are by preference located near the outer sides of the tire, whereby increased flexibility is secured near the outer edges, and the projecting portion d of said tire is sufficiently larger at the lower part than the socket a, in which it is seated, that when forced into said socket the tire will be securely held therein by mechanical force alone and without the aid of adhesive compounds, and will also give more flexibility to the flat portions of the felly, which support the outer tread of the tire.

Having thus described my invention, what I claim as new, and desire to secure by Letters Patent, is—

As an improvement in bicycles, the hollow felly formed with a central rounded socket the walls of which are bent outwardly to form side flanges, in combination with a flexible tire having a rounded raised portion, d, fitted into said socket and projecting side portions which rest upon the side flanges of the felly, said felly having also its under surface near its edges grooved, whereby increased flexibility is obtained, substantially as herein described.

SANDS FORMAN.

Witnesses:
C. E. MACK,
B. F. WALLACE.